United States Patent
Andrews, Jr. et al.

[11] Patent Number: 5,291,110
[45] Date of Patent: Mar. 1, 1994

[54] LOW ACOUSTIC NOISE SEEKING METHOD AND APPARATUS

[75] Inventors: Thomas L. Andrews, Jr., Ward; Gary E. Counts, Arvada, both of Colo.

[73] Assignee: Integral Peripherals, Inc., Boulder, Colo.

[21] Appl. No.: 786,333

[22] Filed: Oct. 31, 1991

[51] Int. Cl.$^5$ .............................. G11B 21/02
[52] U.S. Cl. ....................... 318/560; 318/561; 360/75; 360/78.06; 360/78.04
[58] Field of Search ........ 318/560, 561, 509, 610–625; 369/32, 33, 63–67; 360/72–78

[56] References Cited

U.S. PATENT DOCUMENTS

| | | | |
|---|---|---|---|
| 4,099,112 | 7/1978 | Klinger | 318/561 |
| 4,133,011 | 1/1979 | Kurzweil, Jr. | 318/638 |
| 4,134,053 | 1/1979 | Klinger | 318/561 |
| 4,590,526 | 5/1986 | Laatt et al. | |
| 4,600,868 | 7/1986 | Bryant | 318/567 |
| 4,697,127 | 9/1987 | Stich et al. | 318/561 |
| 4,864,437 | 9/1989 | Couse et al. | |
| 4,937,689 | 6/1990 | Seaver et al. | 360/78.07 |
| 4,956,831 | 9/1990 | Sarrat et al. | 360/78.04 |
| 5,033,037 | 7/1991 | Yanagi | 369/43 |
| 5,050,146 | 9/1991 | Richgels et al. | 360/78.06 |
| 5,128,812 | 7/1992 | Uno | 318/561 X |
| 5,136,440 | 8/1992 | Sidman | 360/78.04 |
| 5,136,561 | 8/1992 | Goker | 360/78.4 |

OTHER PUBLICATIONS

S. Hasegawa et al., "Fast Access Control of the Head Positioning Using a Digital Signal Processor", date unknown.

J. Tal, "Selecting Velocity Profiles for Servo Systems", *Motion*, pp. 3–7 (Sep./Oct. 1990).

*Primary Examiner*—Paul Ip
*Attorney, Agent, or Firm*—Skjerven, Morrill, MacPherson, Franklin & Friel

[57] ABSTRACT

A silent seek servo controller is used in a low profile miniature disk drive to minimize acoustic noise and the problems associated therewith. The silent seek servo controller of this invention reduces acoustic noise generation at the expense of seek performance. Since the silent seek servo controller of this invention minimizes acoustic noise, the controller helps to eliminate vibrations within the computer. The silent seek servo controller is a one mode continuous position servo seek controller that accelerates and decelerates the actuator using a smooth, continuous and completely symmetric acceleration trajectory. Specifically, for a seek time t, the disk drive actuator is accelerated for one-half the seek time, i.e, time t/2, and decelerated for the other half of seek time t. The peak acceleration occurs at time t/4 and the peak deceleration occurs at time 3t/4. The symmetry of each acceleration phase assures that any acoustic noise generated by uneven acceleration is eliminated.

19 Claims, 8 Drawing Sheets

LOW ACOUSTIC NOISE SEEKING METHOD AND APPARATUS

BACKGROUND OF THE INVENTION

1. Field of the Invention

This invention relates generally to servo control systems for track seeks in a disk drive and in particular to a servo control seek system for a low profile miniature disk drive that minimizes acoustic noise generation.

2. Description of Related Art

Typically, a disk drive contains one or more circular planar disks that are coated on each side with a magnetic medium. The disk or disks are mounted on a spindle that extends through the center of each disk so that the disks may be rotated at a predetermined speed, usually about 3600 rpm. Usually, one read/write head is associated with each side of the disk that is coated with a magnetic medium. The read/write head flies a small distance above the disk surface as the disk rotates. The read/write head, in response to signals from electronics associated with the disk drive, writes data at a predetermined location in the magnetic medium. Similarly, the read/write head, in response to other signals from the disk drive electronics, reads the stored data at a predetermined location.

The configuration of the data on the magnetic surface is instrumental in the operation of the disk drive. Data are recorded by the read/write head in concentric circular tracks on the disk. Corresponding tracks on different disk surfaces are cylindrically aligned.

Typically, each track is segmented into one or more parts that are referred to as sectors. Thus, the disk drive must move the read/write head radially across the disk surface to locate the track for reading or writing data and then must follow that track circumferentially until the desired sector passes under the read/write head. Hence, the read/write head is positioned at a predetermined radial and circumferential position over the disk surface.

In a disk drive, each read/write head is usually affixed by an arm to an actuator. In a closed-loop disk drive, a servo system is used to move the actuator.

Many different servo systems have been developed for use in hard disk drives. In an embedded servo system, the read/write head reads a servo pattern contained in a servo field at the start of each sector to determine the radial and circumferential position of the read/write head relative to the disk. The information that is read is provided to the disk drive control loop electronics which in turn generate signals to reposition the read/write head as necessary based on that information.

In response to the signals from the disk drive electronics, the actuator is moved so that the read/write head is moved radially to a specified track. This operation is referred to as a track seek, or sometimes just a seek.

Predictive trajectory techniques have been used to minimize track-to-track seek time by optimizing power transfer to the disk drive actuator and maximizing track crossing slew rates. These methods have been effective in attaining minimum seek times, but these methods have also encountered numerous implementation problems.

The primary factor in minimizing seek time is to maximize both the initial acceleration to reach a control velocity and the deceleration from the control velocity to zero velocity at the targeted track. The waveform of the current applied to the actuator for this type of a seek closely resembles a square wave. As is known to those skilled in the art, a "square wave-like" current excitation is rich in harmonic content and thereby stimulates various resonant frequencies in the actuator system, the head disk assembly, and in small portable computers and palm-type computers, the computer structure itself.

Resonances generated during a seek within the closed loop servo system can be damped or completely compensated for by using signal filtration, gain control and other compensation methods known to those skilled in the art. However, other resonances, particularly those generating acoustic energy, cannot be directly controlled by the servo system. As disk drives become smaller, the effective mass of the drive is reduced. Consequently, the resonances are not damped by the disk drive structure itself and much of the resonant energy is passed to the surrounding structure causing acoustic noise. This noise is not only disconcerting to the user but also introduces residual vibrations in the actuator assembly itself, that in turn may inhibit seek performance.

One prior art system recognized the problem of acoustic noise generated by a track seek and sought to dampen the high frequency components, i.e., the frequency components above about 2.5 KHz, excited by the track seek. A block diagram for this velocity feedback servo system 100 is shown in FIG. 1.

Velocity estimator 110 uses a measured position signal to generate a predicted velocity $\hat{x}_2(k)$. Velocity trajectory generator 120 generates a velocity trajectory profile that is described more completely below. Feedforward generator 130 uses the measured position signal to generate a position vector $x_3(k)$. Each of components 110, 120, 130 in velocity feedback seek servo system 100 performs a calculation in real time with a signal processor on-board the disk drive.

Specifically, the control law for velocity feedback seek servo system 100 was:

$$U(k) = K_v(V_{target} - \hat{x}_2(k)) + Kf\, x_3(k)$$

The velocity trajectories used in velocity feedback servo system 100 were generated by minimizing the square of the differentiated acceleration of the actuator. This required a complex set of calculations that determined the eigenvalues of a Hamiltonian matrix. The optimal state was reported to be:

position
$$x_1(t) = -60a\left[\frac{1}{10}\left(\frac{t}{T_0}\right)^5 - \frac{1}{4}\left(\frac{t}{T_0}\right)^4 + \frac{1}{6}\left(\frac{t}{T_0}\right)^3\right]$$

velocity
$$x_2(t) = -60\frac{a}{T_0}\left[\frac{1}{2}\left(\frac{t}{T_0}\right)^4 - \left(\frac{t}{T_0}\right)^3 + \frac{1}{2}\left(\frac{t}{T_0}\right)^2\right]$$

acceleration
$$x_3(t) = -60\frac{a}{T_0^2}\left[2\left(\frac{t}{T_0}\right)^3 - 3\left(\frac{t}{T_0}\right)^2 + \left(\frac{t}{T_0}\right)\right]$$

For a more detailed description of these control equations, see S. Hasegawa et al., entitled "Fast Access Control of the Head Positioning Using a Digital Signal Processor,".

The trajectories for these equations are plotted in FIG. 2 against a normalized time variable (t/To), where To is the seek time. There are several important aspects to notice about FIG. 2. First, the acceleration and deceleration phases have symmetry about time t/To=0.5. However, neither the acceleration nor the deceleration trajectories are symmetric.

Specifically, the peak acceleration occurs at time t/To=0.21 and the peak deceleration occurs at time t/To=0.79 on the normalized time scale. The initial acceleration to the positive acceleration peak is faster than the deceleration from the positive acceleration peak to the negative peak and then the deceleration from the negative peak back to zero increases again. While servo seek system 100 is reported to abate high frequency noise, the acceleration trajectory is unsymmetric within an acceleration phase which could possibly excite other frequency vibrations.

Moreover, servo seek system 100 was reportedly used with a five inch diameter disk drive with a 25 mm stroke that had an actuator moving mass equivalent of 10.1 grams. This is a relatively massive actuator assembly compared to the actuator assemblies used in low profile disk drives with a form factor of 1.8 inches, for example. Consequently, the effects of the uneven acceleration upon noise generation in the less massive assemblies are unknown.

There are two additional factors about velocity feedback seek servo system 100 that further limit its applicability to miniature disk drives. Velocity is not a physically measurable quantity. Therefore, velocity feedback seek servo system 100 was required to perform multiple calculations to estimate the velocity and the projected velocity along with the feed forward position.

In small low profile miniature disk drives, the disk is not rigidly clamped to the spindle and so the center of the disk may not be aligned with the center of rotation of the disk drive. This is referred to as disk runout. Since system 100 was used in a large disk drive where the disk is rigidly affixed to the spindle, problems such as runout compensation do not arise. Consequently, the signal processor may be devoted to the necessary calculations during the seek operations to generate the required signals.

If the on-board microprocessor is used to generate runout compensation for the closed loop servo system, this reduces the time that the microprocessor is available for seek control. Moreover, the seek control and the runout compensation must both be performed within a sector time. Consequently, a seek system such as that illustrated in FIG. 1, which requires multiple calculations during a sector time period, may overload the on-board micro-processor. While going to an additional microprocessor may alleviate the problem, the miniaturization of the disk drive requires elimination of parts rather than the addition of parts. Thus, a seek system that minimizes acoustic noise and is compatible with low profile miniature disk drives is needed.

SUMMARY OF THE INVENTION

According to the principles of this invention, a silent seek servo controller is used in a low profile miniature disk drive to minimize acoustic noise and the problems associated therewith. The silent seek servo controller of this invention is a one mode continuous position servo seek controller that accelerates and decelerates the actuator using a smooth, continuous and completely symmetric acceleration trajectory.

Specifically, for a seek time t, the disk drive actuator is accelerated for one-half the seek time, i.e, time t/2, and decelerated for the other half of seek time t. The peak acceleration occurs at time t/4 and the peak deceleration occurs at time 3t/4. Further, the deceleration trajectory and the acceleration trajectory are mirror images of each other. The symmetry of each acceleration phase assures that any acoustic noise generated by uneven acceleration is eliminated.

A further restriction is that the acceleration trajectory varies smoothly and does not include any cusps or changes that would possibly introduce resonances. Mathematically, this means that at least the first derivative of the acceleration must be continuous.

Hence, according to the principles of this invention, the silent seek servo controller accelerates and decelerates the actuator using a smooth, continuous and completely symmetric acceleration trajectory. Since the acceleration trajectory is given, the acceleration trajectory is integrated over time to obtain the velocity trajectory. The velocity trajectory is then integrated over time to obtain the actuator position trajectory. This actuator position trajectory is stored in a look up table as a function of the fraction of the elapsed seek time.

Hence, in one embodiment, the silent seek servo system of this invention includes a microprocessor in a low profile miniature disk drive with a silent seek servo controller operating in the microprocessor. The silent seek servo controller is responsive to a seek command from a disk controller and generates a position signal for an actuator of the miniature disk wherein the position signal causes the disk drive actuator to move with a smooth, continuous and completely symmetric acceleration trajectory thereby minimizing the acoustic noise generated by acceleration and deceleration of the actuator.

The seek controller includes a means for counting each sector pulse generated during the seek where each sector pulse represents one sector period. The seek controller also includes a look-up table that has a plurality of values wherein each value represents a position for an elapsed time of the seek where the elapsed time is measured in terms of sector periods.

In response to the seek command from a disk controller, the silent seek servo controller determines the number of tracks that the actuator must be moved to reach the new track location specified by the disk controller. A seek time converter in the silent seek servo controller then converts the number of tracks in the seek into sector periods. The number of sector periods are loaded into the counting means. Each subsequent sector pulse increments the counting means so the value of the counting means represents the fraction of time that has elapsed in the seek.

A pointer generating means, operatively coupled to the counting means and to the look-up table, generates a position pointer to a value in the look-up table corresponding to the servo period count from the counting means in relation to the total seek time in sector periods. In one embodiment, the pointer position TABLE POSITION is given by:

$$\text{TABLE POSITION} = m - \left( \frac{m}{\text{SEEKTIME}_S} * (SKTM) \right)$$

where the seek time for a seek of S tracks is SEEKTIME$_S$, SKTM represents the sector period count from the counting means, and the look-up table includes m values.

For a sinusoidal acceleration trajectory the values in the look-up table are determined using the expressions:

$$SINPOS_{SCTR} = ACC*Im*\left[ \frac{(SCTR*SCTR)}{2} - \left[ \frac{1 - \cos(K\sin*SCTR)}{K\sin*K\text{SIN}} \right] \right]$$

and $$SINDEPOS_{SCTRD} = (-ACC)*Im*$$

$$\left[ \frac{[SCTRD - [2\tau]]^2}{2} - \left[ \frac{1 - \cos(K\sin * SCTRD)}{K\sin \cdot K\sin} \right] - \frac{\tau^2}{2} \right] +$$

$$SINPOS_\tau$$

where
ACC = acceleration constant;

Im = maximum actuator current;

$$K_{sin} = \frac{2*\pi}{\tau} ;$$

SEEKTIME = number of sector periods elapsed in the seek;

$$\tau = \frac{\text{SEEKTIME}}{2.} ;$$

SCTR = 0, 1, . . . , $\tau$

SECTD = $\tau$, . . . , SEEKTIME

In another embodiment, the look-up table includes sinusoidal acceleration values where the seek length corresponds to one period of the acceleration function. In this embodiment, the silent seek servo system performs a double integration using the acceleration value retrieved from the look-up table to generate a position signal.

DETAILED DESCRIPTION

Figure 1:
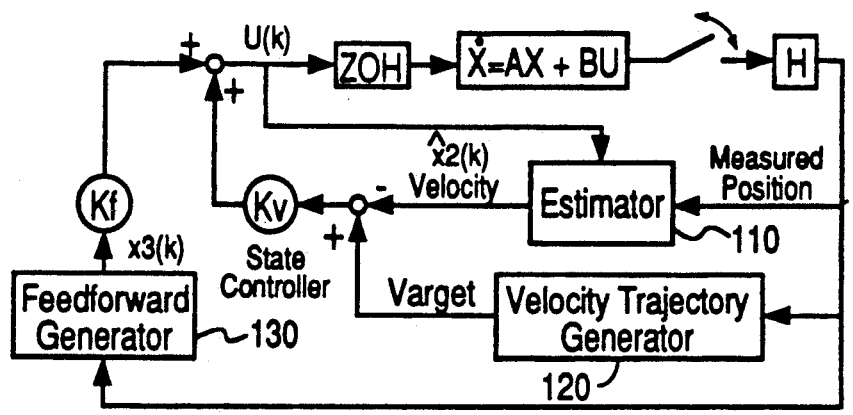
FIG. 1 is a prior art seek control system that uses velocity estimations to control the seek operation.
Figure 2:
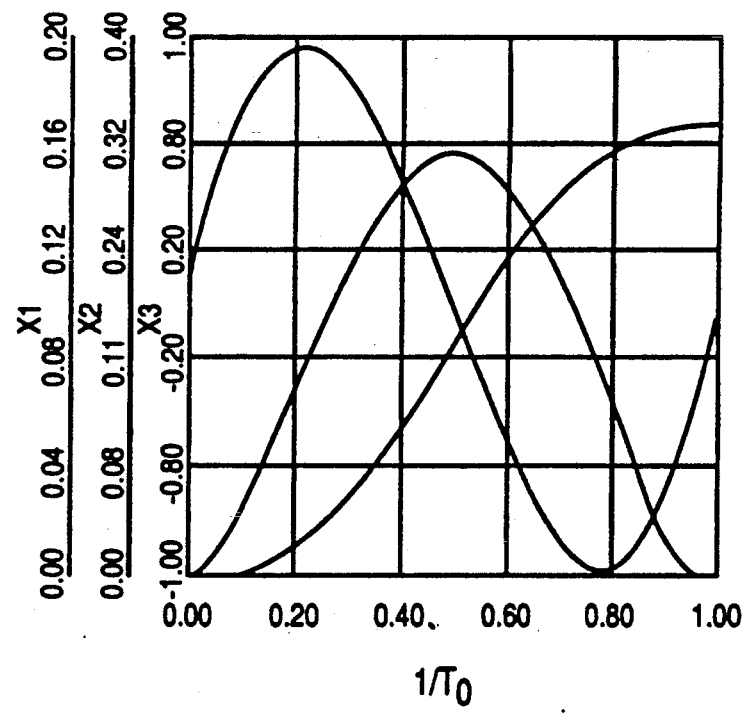
FIG. 2 is a drawing of the projected trajectories or acceleration, speed and position that are used in this prior art system of FIG. 1.

According to the principles of this invention, a silent seek servo controller is used in a low profile miniature disk drive to minimize acoustic noise and the problems associated therewith. Unlike prior art seek systems that sought to minimize seek time, the silent seek servo controller of this invention reduces acoustic noise generation at the expense of seek performance.

However, the low profile miniature disk drive in which the silent seek servo controller is incorporated is used in notebook or palm sized computers. Typically, such computers operate at somewhat slower speeds and the dominant requirements for disk drives are low power consumption and immunity to shock and vibration. Since the silent seek servo controller of this invention minimizes acoustic noise, the controller helps to eliminate vibrations within the computer.

The silent seek servo controller of this invention is a one mode continuous position servo seek controller that accelerates and decelerates the actuator using a smooth, continuous and completely symmetric acceleration trajectory. Specifically, for a seek time t, the disk drive actuator is accelerated for one-half the seek time, i.e, time t/2, and decelerated for the other half of seek time t. The peak acceleration occurs at time t/4 and the peak deceleration occurs at time 3t/4. Further, the deceleration trajectory and the acceleration trajectory are mirror images of each other. The symmetry of each acceleration phase assures that any acoustic noise generated by uneven acceleration as in the prior art system 100 is eliminated.

Hence, according to the principles of this invention, the acceleration trajectory and the deceleration trajectory have symmetry about time t/2, and each trajectory is symmetric about its peak. A further restriction is that the acceleration trajectory varies smoothly and does not include any cusps or changes that would possibly introduce resonances. Mathematically, this means that at least the first derivative of the acceleration must be continuous.

Hence, according to the principles of this invention, the silent seek servo controller accelerates and decelerates the actuator using a smooth, continuous and completely symmetric acceleration trajectory. Since the acceleration trajectory is given, the acceleration trajectory is integrated over time to obtain the velocity trajectory. The velocity trajectory is then integrated over time to obtain the actuator position trajectory. This actuator trajectory is stored in a look up table as a function of the fraction of the elapsed seek time. Consequently, multiple complex velocity calculations are not required to achieve the acceleration trajectories. Hence, the silent seek servo controller of this invention is suitable for use in miniature disk drives that require run-out compensation.

To further demonstrate the principles of this invention, a specific low profile miniature disk drive and a specific acceleration trajectory are described more completely below. This description is illustrative only of the principles of this invention and is not intended to limit the invention to the specific dimensions, trajectories, characteristics, and times selected.

Figure 3:
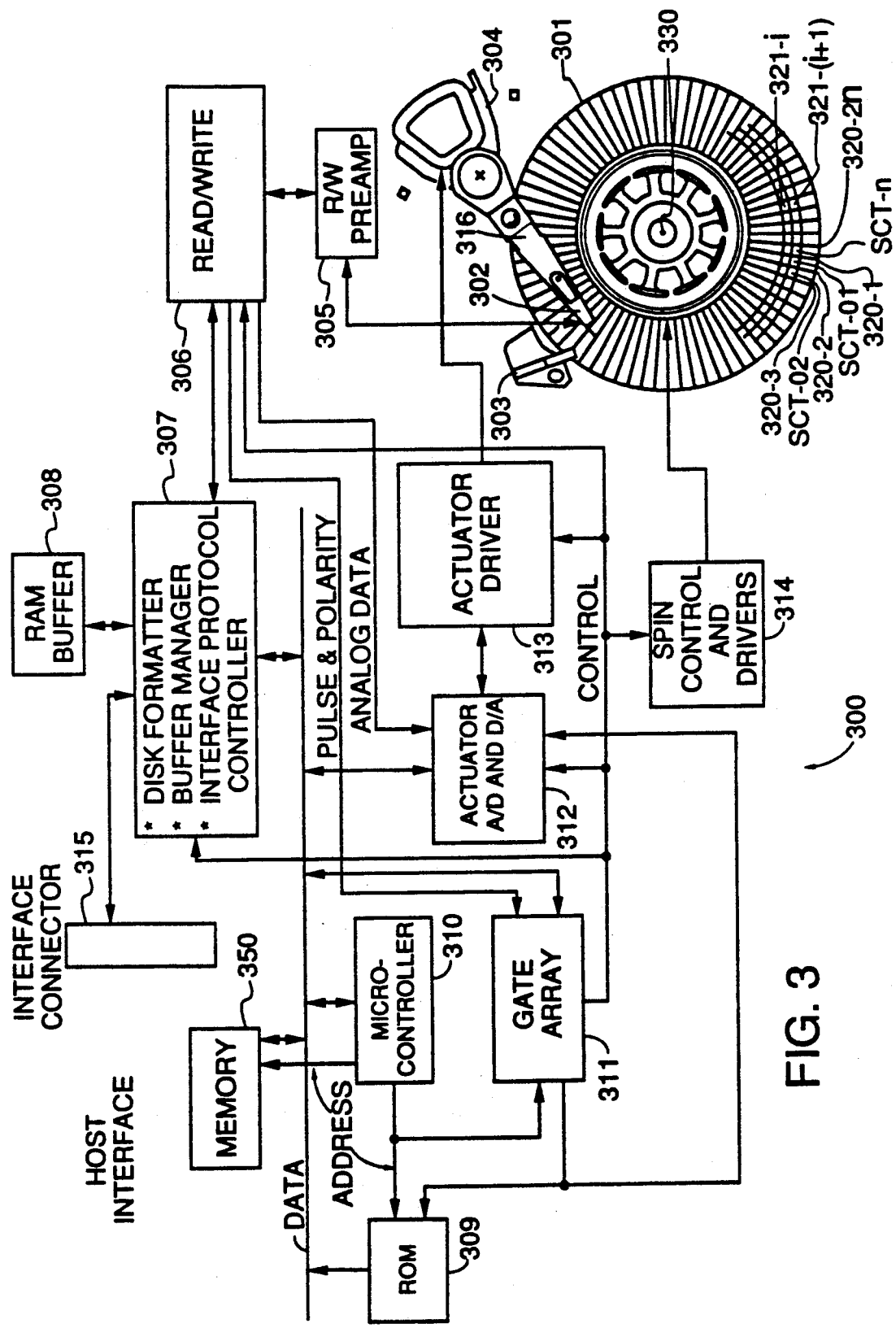
FIG. 3 is a diagram of a low profile miniature disk drive that includes the silent seek servo controller of this invention.

In one embodiment of this invention, the silent seek servo controller is used in a miniature, 1.8 inch footprint disk drive 300 (FIG. 3). Disk drive 300 contains one or more circular planar disks 301. Each disk is coated on at least one side with a magnetic medium as in the prior art disk. Data are recorded by read/write head 302 in concentric circular tracks on the disk, e.g. tracks 321-i and 321-(i+1). Corresponding tracks on different disk surfaces are approximately cylindrically aligned.

Each track is segmented into one or more sectors SCT-01, SCT-02, ..., SCT-n by prerecorded information in embedded servo field regions 320-1 through 320-n. Each servo field region 320-j where j=1, 2, ..., n, includes m servo fields, where m is the number of concentric circular data tracks on disk, i.e., one servo field in each data track at position j for a total of nm servo fields per surface. In one embodiment, as described more completely below, disks 301 are 1.89 inches (48 mm) in diameter and have 632 data tracks.

The interface of disk drive 300 with a computer system and the electronics required in conjunction with an embedded servo system to read and write data on disk 301 in response to signals from a disk controller to interface connection 315 are known to those skilled in the art. The radial and circumferential positioning of read/write head 302 using embedded servo data and a servo system is also well known. In this particular system, the servo system includes R/W preamp 305, combined read/write circuit 306, actuator A/D and D/A circuit 312, actuator driver circuit 313, gate array 311, and microcontroller 310.

In addition, microcontroller 310 has access to memory 350 for storing and retrieving data. Upon power-up of disk drive 300, firmware for a proportional integral difference (PID) servo compensator, silent seek servo controller 400 of this invention, an a runout servo compensator in ROM 309 is loaded into microcontroller 310. In this embodiment, microcontroller 310 is a 46100(HPC+) microprocessor supplied by National Semiconductor of Santa Clara, Calif.

The PID servo compensator in microcontroller 310 receives a digital position error signal for a sector in the track and determines the position correction needed to position read/write head 302 over the centerline of the track for that sector. The position correction is used to generate a servo compensation signal for that sector. The servo compensator applies a gain factor to the servo compensation signal to create a digital actuator position adjustment signal for that sector.

Microcontroller 310 sends the digital actuator position adjustment signal to a D/A converter that resides in actuator A/D and D/A circuit 312. The actuator position adjustment signal is processed and applied to the actuator in a conventional fashion. This process is sequentially repeated for each sector in a track.

The particular system illustrated in FIG. 3 is described more completely in copending and commonly assigned U.S. patent application Ser. No. 07/629,948 of Morehouse et al. filed on Dec. 19, 1990 and entitled "Miniature Hard Disk Drive For Portable Computers," which is incorporated herein by reference in its entirety.

Figure 4:
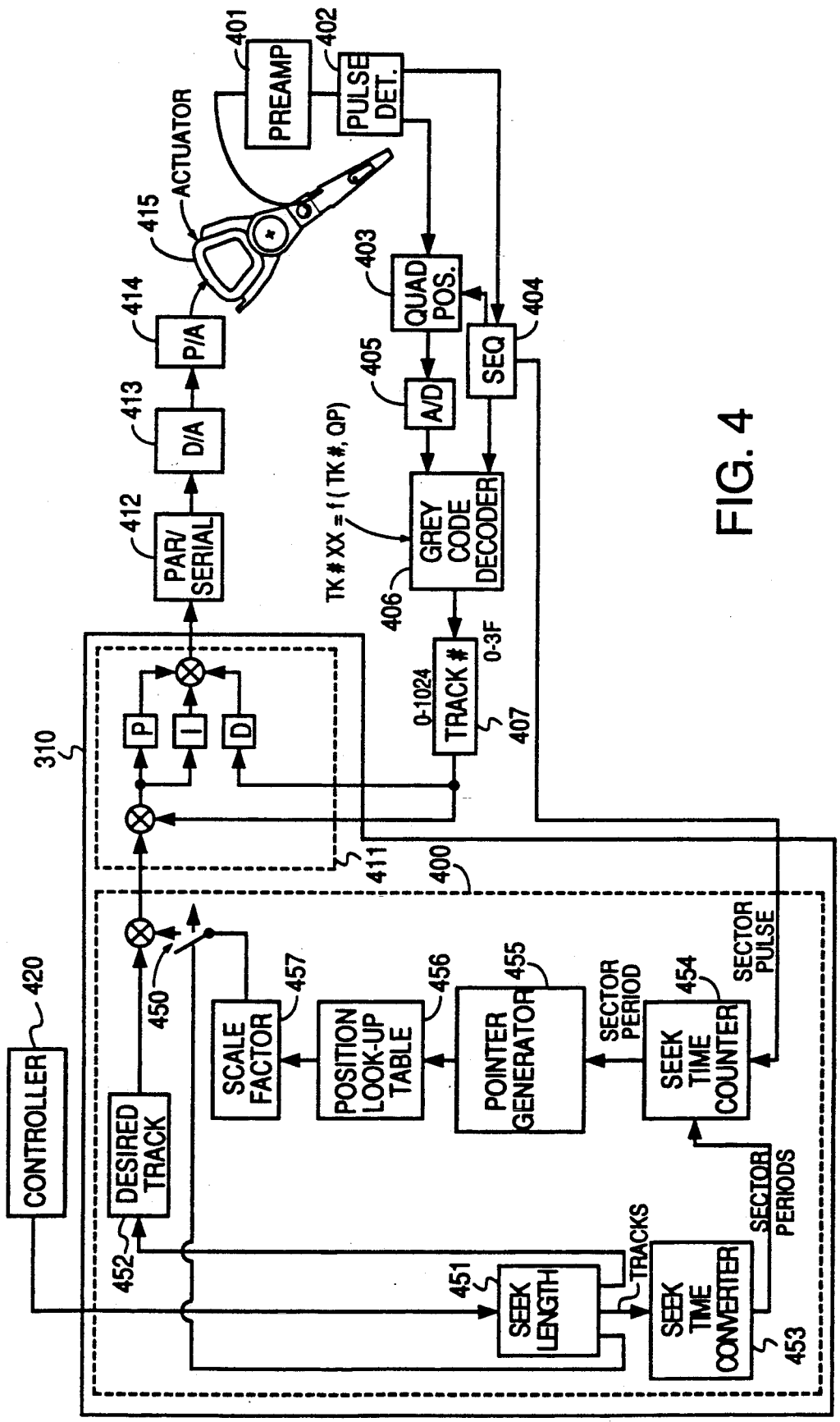
FIG. 4 is a more detailed block diagram of the silent seek servo controller of this invention and the method used in the silent seek servo controller.

A more detailed block diagram of silent seek servo controller 400 is illustrated in FIG. 4. The read/write head signal is amplified by preamp 401. Pulse detector circuit 402 provides pulse height information to quadrature position detector 403 and to sector pulse detection circuit 404. Sector pulse detection circuit 404 provides a sector pulse to silent seek servo controller 400 and to Grey code address decoder 406. The information passed to pulse detector 402 is also supplied to analog to digital converter 405. The digital information from A/D converter 405 is processed by Grey code address decoder 406 and the information from decoder 406 is converted to an absolute track address by track number circuit 407. Proportional integral difference (PID) servo compensator 411 in microcontroller 310 receives a track positioning signal from track number circuit 407. In FIG. 4, the disk drive electronics are shown as serially connected for ease of illustration. However, as illustrated in FIG. 3, the various electronic circuits are interconnected in a manner well-known to those skilled in the art, which includes serial connections and connections that bypass some circuits.

The output signal from PID servo compensator 411 is converted to a parallel signal by circuit 412 for processing by digital to analog converter 413. The analog signal for D/A converter 413 is amplified by power amplifier 414 and the amplified signal is used to move actuator 415. The operation of the various circuits and servo compensator 411 in response to signals in the embedded servo fields on the disk are well-known to those skilled in the art.

Silent seek servo controller 400 is coupled to PID servo compensator 411 by switch 450. Normally, switch 450 is open so that silent seek servo controller 400 is isolated from PID servo compensator 411. When disk controller 420 issues a seek command, the new track address is provided to silent seek servo controller 400. After silent seek servo controller has determined the seek length, i.e, the number of tracks that must be traversed and the direction, the address of the new track position is stored in desired track 452. Also, a signal is generated to close switch 450 so that the output signal from silent seek servo controller is driving PID servo compensator 411.

As explained more completely below, silent seek servo controller 400 generates an output signal that causes actuator 415 to move with a smooth, continuous, and completely symmetric acceleration trajectory. Specifically, for each sector period during the seek, a new position signal is supplied to PID servo compensator 411. Hence, unlike prior art velocity based seek systems, the system of this invention generates a smooth acceleration using only position information.

As described above, the first requirement for silent seek servo controller 400 is to select a smooth, continuous, and completely symmetric acceleration trajectory.

In this embodiment, the acceleration trajectory for actuator 415 is taken as one period of a sine wave. The period of the sine wave is seek time t. In addition, as explained more completely, seek time t is divided into a predetermined number of sector periods. In each sector period, the actuator is moved an additional distance that results from the acceleration up to that sector period so that the end of seek time t, the actuator has positioned the read/write head over the new track.

The actuator acceleration trajectory corresponds to the positive portion of the sine wave and the actuator deceleration trajectory corresponds to the negative portion. Thus, the acceleration and deceleration trajectories have symmetry about time t/2, and each trajectory is symmetric about its peak.

According to the principles of the invention, the positive portion of the sine wave actuator acceleration trajectory of actuator 415 is given by acceleration trajectory $SINACCEL_{SCTR}$ where:

$$SINACCEL_{SCTR} = ACC * Im * (1 - cos(Ksin * SCTR)) \quad (1)$$

where $ACC$ = acceleration constant;

$Im$ = maximum actuator current;

$K_{sin} = \frac{2 * \pi}{\tau}$ ;

SEEKTIME = seek time $t$ expressed in a number of sector periods where a sector period is the time required for one sector to pass under read/write head;

$\tau = \frac{SEEKTIME}{2}$ ;

$SCTR = 0, 1, \ldots, \tau$.

Figure 5:
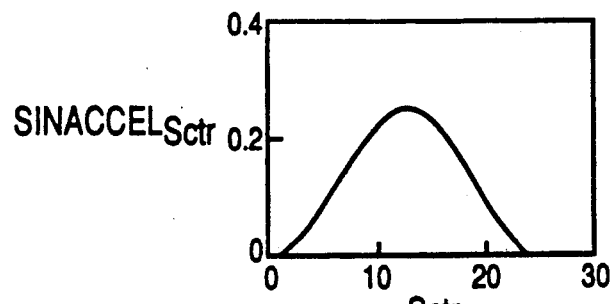
FIG. 5 illustrates acceleration trajectory SINACCEL$_{SCTR}$ for a seek time of 50 sector periods.

Notice that the positive portion of the sine wave is represented by one period of the function (1-cosine), which is a strictly positive function that has a single peak at time t/4 and is symmetric about the peak. The acceleration and its first derivative are both zero at time 0 and at time t/2. FIG. 5 illustrates acceleration trajectory $SINACCEL_{SCTR}$ for a seek time of 50 sector periods, where as described more completely below, 50 sector periods represent a seek that requires a traversal of a predetermined number of tracks.

The actuator velocity is the integral over time of acceleration trajectory $SINACCEL_{SCTR}$. Here, time is measured in terms of sector periods SCTR so that the velocity for a particular sector period SCTR is the integral from time zero to time SCTR of acceleration trajectory $SINACCEL_{SCTR}$. Specifically, $$SINVEL_{SCTR} = ACC * Im * \int_0^{SCTR} (1 - Cos(Ksin * T))dT$$

$$SINVEL_{SCTR} = ACC * Im * \left[ SCTR - \left[ \frac{sin(Ksin*SCTR)}{Ksin} \right] \right]$$

Figure 6:
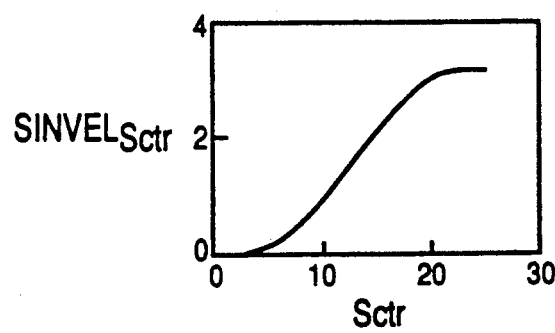
FIG. 6 illustrates velocity trajectory SINVEL$_{SCTR}$ for a seek time of 50 sector periods.

FIG. 6 illustrates velocity trajectory $SINVEL_{SCTR}$ for a seek time of 50 sector periods.

Similarly, the actuator position resulting from the acceleration is the integral over time of velocity trajectory $SINVEL_{SCTR}$. Hence, the actuator position for a particular sector period SCTR is the integral from time zero to time SCTR of velocity trajectory $SINVEL_{SCTR}$. Specifically, $$SINPOS_{SCTR} = \qquad (2)$$

$$ACC * Im * \int_0^{SCTR} \left[ T - \left[ \frac{sin(Ksin*T)}{Ksin} \right] \right] dT$$

$SINPOS_{SCTR}$ =

$$ACC * Im * \left[ \frac{(SCTR*SCTR)}{2} - \left[ \frac{1 - cos(Ksin*SCTR)}{Ksin*Ksin} \right] \right]$$

Figure 7:
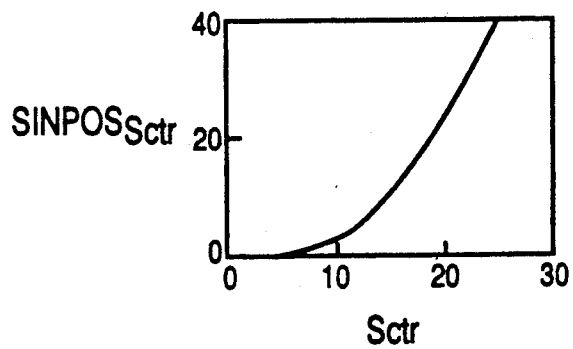
FIG. 7 illustrates actuator trajectory SINPOS$_{SCTR}$ for a seek time of 50 sector periods and sinusoidal acceleration trajectory SINACCEL$_{SCTR}$

FIG. 7 illustrates actuator trajectory $SINPOS_{SCTR}$ for a seek time of 50 sector periods and sinusoidal acceleration trajectory $SINACCEL_{SCTR}$. According to the principles of the invention, the negative portion of the sine wave actuator acceleration trajectory of actuator 415 is given by acceleration trajectory $SINDECEL_{SCTRD}$ where:

$$SINDECEL_{SCTRD} = -ACC * Im * (1 - cos(Ksin * SCTRD)) \quad (3)$$

where $ACC$ = acceleration constant;

$Im$ = maximum actuator current;

$K_{sin} = \frac{2 * \pi}{\tau}$ ;

SEEKTIME = seek time $t$ expressed in a number of sector periods where a sector period is the time required for one sector to pass under read/write head;

$\tau = \frac{SEEKTIME}{2}$ ; and $SECTD = \tau, \ldots,$ SEEKTIME.

Notice that the negative portion of the sine wave is represented by one period of the function —(1-cosine), which is a strictly negative function that has a single peak at time 3t/4 and is symmetric about the peak. The deceleration and its first derivative are both zero at time t/2 and at time t. Since the deceleration is exactly the negative of the acceleration, the acceleration trajectory as a whole is symmetric. Also since both (1-cosing) and —(1-cosine) are zero and have zero slope at t/2, the acceleration trajectory is continuous and smooth.

Figure 8:
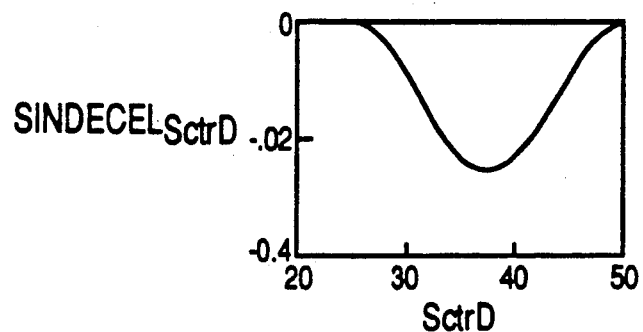
FIG. 8 illustrates deceleration trajectory SINDECEL$_{SCTRD}$ for a seek time of 50 sector periods.

FIG. 8 illustrates deceleration trajectory $SINDECEL_{SCTRD}$ for a seek time of 50 sector periods. Notice that deceleration trajectory $SINDECEL_{SCTRD}$ is defined from time $\tau$ to time SEEKTIME. The velocity during the deceleration is the integral over time of deceleration trajectory $SINDECEL_{SCTRD}$ plus the velocity acquired during acceleration. Again, time is measured in terms of sector periods SCTRD so that the velocity for a particular sector period SCTRD is the integral from time $\tau$ to time SCTRD of acceleration trajectory $SINDECEL_{SCTRD}$.

At time $\tau$, actuator 415 had velocity $$SINVEL_\tau = ACC * Im \left[ \tau - \left[ \frac{\sin(K\sin * \tau)}{K\sin} \right] \right]$$

$$= ACC * Im * \tau$$

The actuator velocity during deceleration is:

$SINDEVEL_{SCTRD} =$ $$-ACC*Im* \int_\tau^{SCTRD} [1 - \cos(K\sin*T)]dT + SINVEL_\tau$$

$SINDEVEL_{SCTRD} =$ $$(-ACC)*Im* \left[ [-\tau + SCTRD] - \left[ \frac{\sin(K\sin*SCTRD)}{K\sin} \right] \right] +$$

$$SINVEL_\tau$$

Figure 9:
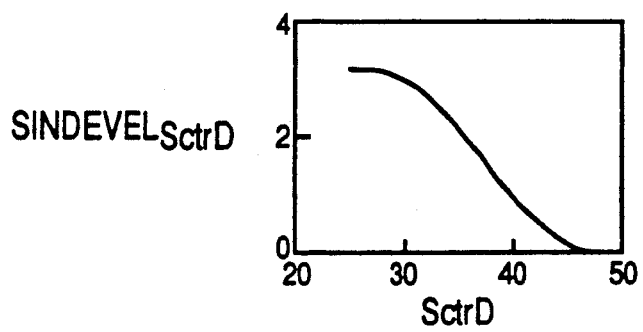
FIG. 9 illustrates velocity trajectory SINDEVEL$_{SCTRD}$ of the actuator for a seek time of 50 sector periods.

FIG. 9 illustrates velocity trajectory SINDEVEL$_{SCTRD}$ of the actuator for a seek time of 50 sector periods.

Similarly, the actuator position during the deceleration is the integral over time of velocity trajectory SINDEVEL$_{SCTRD}$ plus the position displacement as a result of acceleration. The actuator position when acceleration goes to zero is:

$$SINVEL_\tau = ACC*Im \left[ \frac{\tau^2}{2} - \left[ \frac{1 - \cos(K\sin * \tau)}{K\sin^2} \right] \right]$$

$$= ACC*Im * \frac{\tau^2}{2}$$

Hence, the actuator position for a particular sector period SCTRD is this value plus the integral from time $\tau$ to time SCTRD of velocity trajectory SINDEVEL$_{SCTRD}$. Specifically, $SINDEPOS_{SCTRD} =$ (4)

$$-ACC*Im* \int_\tau^{SCTRD} \left[ [-\tau + T] - \left[ \frac{\sin[K\sin*T]}{K\sin} \right] \right] dT +$$

$$SINPOS_\tau$$

$SINDEPOS_{SCTRCD} = (-ACC)*Im*$ $$\left[ \frac{[SCTRD - [2\tau]]^2}{2} - \left[ \frac{1 - \cos(K\sin*SCTRD)}{K\sin \cdot K\sin} \right] - \frac{\tau^2}{2} \right] +$$

$$SINPOS_\tau$$

Figure 10:
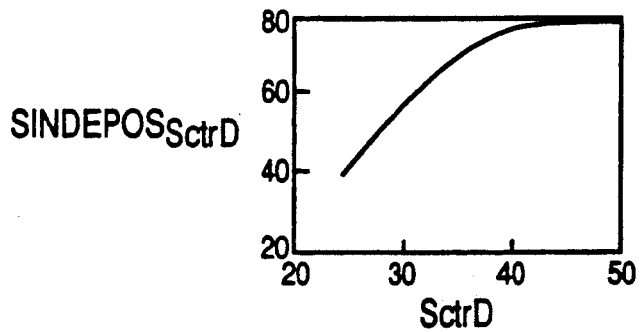
FIG. 10 illustrates actuator trajectory SINDEPOS$_{SCTRD}$ for a seek time of 50 sector periods and sinusoidal deceleration trajectory SINDECEL$_{SCTRD}$.

FIG. 10 illustrates actuator trajectory SINDEPOS$_{SCTRD}$ for a seek time of 50 sector periods and sinusoidal deceleration trajectory SINDECEL$_{SCTRD}$.

To use acceleration position SINPOS$_{SCTR}$ and deceleration position SINDEPOS$_{SCTRD}$ in silent seek servo controller 400, there are several additional factors that must be defined. First, the maximum velocity permitted for actuator 415 must be established to assure that actuator 415, in response to the sinusoidal acceleration, does not exceed the maximum velocity. Second, the number of tracks in the seek must be converted to a seek time. Finally, the parameters used in silent seek servo control system 400 must be checked to verify that the maximum actuator current is not exceeded.

In this embodiment, one limitation on the maximum actuator velocity is the range of motion that the servo system may move the read/write head during the portion of the embedded servo field that contains the cylinder address and position information. For example, in the 1.8 inch footprint disk drive, this time is about 25 microseconds. In general, this time depends on the number of bytes in the cylinder address and the number of normal and quadrature frames in the position sub-field of the embedded servo field.

The sector period is about 233 microseconds, which means there are 72 sectors in a track and the disk spin speed is about 3600 rpm. Maximum velocity MXVEL is the distance traveled, i.e., 1 track, divided by the time required to move the 1 track, i.e., the fraction of the sector period. Thus, for this example, maximum velocity MXVEL is:

$$MXVEL = \frac{FULLTRK}{SERVOINFO} * SECTORPERIOD \text{(Tracks/Sector Period)}$$

$$= 9.33 \text{ (Tracks/Sector Period)}$$

where

SECTEORPERIOD = 233.33 $\mu$seconds/Sector Period;

FULLTRK = 1.0 Tracks; and

SERVOINFO = 25 $\mu$seconds.

Hence, for a maximum velocity MXVEL of about 9 tracks per sector period, a disk having a density of about 1900 tracks/inch, and a sector period of 233.33 $\mu$seconds, actuator velocity ACTVEL is $$ACTVEL = \frac{MXVEL}{TPI * SECTORPERIOD} \text{ inches/second}$$

$$= 20.33 \text{ inches/second}$$

where

SECTORPERIOD = 233.33 $\mu$seconds/sector period

MXVEL = 9 tracks/sector period

TPI = 1900 tracks/inch

Another limit on the maximum actuator velocity is the range of motion that the servo system may move the read/write head during the portion of the embedded servo field that contains only the position information. For example, in the 1.8 inch footprint disk drive, this time is about 9 microseconds.

Again, the sector period is about 233 microseconds, which means there are 72 sectors in a track and the disk spin speed is about 3600 rpm. In this case, the maximum velocity MXVEL is the distance traveled, i.e., one-half of a track, divided by the time required to move the one-half of a track, i.e., the fraction of the sector period. Thus, for this example, maximum velocity MXVEL is:

$$MXVEL = \frac{FULLTRK}{SERVOINFO} *$$
$$SECTORPERIOD(Tracks/Sector\ Period)$$
$$= 12.963\ (Tracks/Sector\ Period)$$

where

SECTORPERIOD = 233.33 μseconds/Sector Period;

FULLTRK = 0.5 Tracks; and

SERVOINFO = 9 μseconds.

Hence, for a maximum velocity MXVEL of about 12.96 tracks per sector period, a disk having a density of about 1900 tracks/inch, and a sector period of 233.33 μseconds, actuator velocity ACTVEL is $$ACTVEL = \frac{MXVEL}{TPI * SECTORPERIOD}\ \text{inches/second}$$
$$= 29.23\ \text{inches/second}$$

where
SECTORPERIOD = 233.33 μseconds/sector period
MXVEL = 12.96 tracks/sector period
TPI = 1900 tracks/inch A maximum actuator velocity in the range of 20 inches per second to 25 inches per second, preferably about 20 inches per second, permits adequate time for reading of the embedded servo data in each sector. Thus, in one embodiment, silent seek servo controller 400 limits the maximum actuator velocity to about 9 tracks per sector period.

To evaluate the performance of silent seek servo controller 400, the seek length in tracks must be related to seektime SEEKTIME in sector periods. The symmetrical acceleration and deceleration profiles require that at one half of seektime SEEKTIME, i.e., time τ, the acceleration of the actuator must be zero and the actuator must be at the peak velocity. Thus, $$PEAKVEL = SINVEL_\tau = KACCEL * \tau$$
$$PEAKVEL = KACCEL * (SEEKTIME/2)$$
$$2*PEAKVEL = KACCEL * SEEKTIME$$
where
$$KACCEL = ACC * Im$$
$$\tau = SEEKTIME/2$$

Similarly, distance S traversed by the actuator is simply distance SINDEPOS$_{2\tau}$, which is:

$$S = KACCEL * \tau^2/2 + KACCEL * \tau^2/2$$
$$S = KACCEL * \tau^2$$
$$S = (SEEKTIME/4.0) * (KACCEL * SEEKTIME)$$

However, from above $$2*PEAKVEL = KACCEL * SEEKTIME$$
$$S = (SEEKTIME/4.0) * (2*PEAKVEL)$$
Thus,
$$SEEKTIME_S = (2.0 * S)/PEAKVEL$$

Note that the peak velocity PEAKVEL is a function of the seek distance S and the seektime SEEKTIME$_S$. Thus, a subscript S is also used on peak velocity PEAKVEL$_S$ to denote this dependence. However, for the embodiment described above peak velocity PEAKVEL$_S$ is 9 tracks per sector period.

In one embodiment, the seek time SEEKTIME$_S$ is taken as a linear function of seek distance S. Thus, $$SEEKTIME_S = YINTERCEPT + (SLOPE * S)$$
where
S = Number of tracks in seek
YINTERCEPT = Intercept of the linear function representing the seek time on the y-axis
SLOPE = Slope of the linear function representing the seek time To define the slope and y-intercept for the linear representation of the seek time, two points on the line must be defined. In this embodiment, a minimum seek time and a maximum seek time are used to define the linear function.

For the minimum seek of one track, i.e., S$_{MIN}$=1, the seek time is taken as 10 sector periods. Thus, $$SEEKTIME_{MIN} = SEEKTIME_1 = 10$$

For the maximum seek of 615 tracks, i.e., S$_{MAX}$=615, the seek time is limited by the peak velocity. Thus, from above, $$SEEKTIME_{MAX} =$$
$$SEEKTIME_{615} = \frac{2 * 615\ Tracks}{9\ Tracks/Sector\ Period}$$
$$= 136.667\ Sector\ Periods$$

As is known to those skilled in the art, the slope of a linear function is:

$$SLOPE = \frac{SEEKTIME_{MAX} - SEEKTIME_{MIN}}{S_{MAX} - S_{MIN}}$$
$$= \frac{136.667 - 10}{614}$$
$$= 0.206$$
and
$$YINTERCEPT = SEEKTIME_{MIN} - (SLOPE * S_{MIN})$$
$$= 10 - (0.206 * 1)$$
$$= 9.79$$

Figure 11:
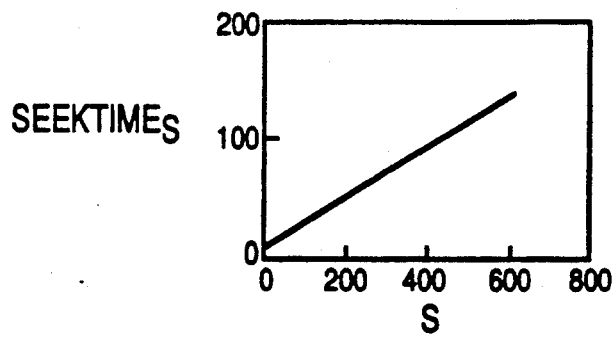
FIG. 11 illustrates seek time SEEKTIME$_S$ in sector periods for a seek length of S tracks.

FIG. 11 is a graphical representation of the relationship between seek time and seek length. Thus, the seek time for a seek of S tracks is:

$$SEEKTIME_S = 9.79 + 0.206 * S \qquad (5)$$
where
S = 1, 2, 3, . . . , 615
$$SEEKTIME_1 = 10 * 233$$
$$= 2.33\ \text{milliseconds}$$

$$SEEKTIME_{615} = 136.667 * 233$$
$$= 31.8\ \text{milliseconds}$$

Average access time T$_{AVG}$ for silent seek servo controller 400 is:

$$T_{AVG} = \left[ \frac{\sum_n (S_{max} - S + 1) \cdot SEEKTIME_s}{\sum_s S} \right] \cdot SERVOPERIOD$$

$$= 0.012 \text{ Seconds}$$

Hence, each track seek has the same low noise acceleration trajectory and the time of the seek is bounded by the minimum seek time and the maximum seek time definitions. The minimum seek time is selected to assure that sufficient actuator adjustments are performed to force the actuator to have the low noise acceleration trajectory. Further, minimum and maximum seek times are selected so that the maximum actuator velocity is not exceeded. Hence, the important aspect is to minimize acoustic noise generation rather than seek time performance.

The position values in expressions (2) and (4) above require a definition of maximum current Im and acceleration constant ACC. In this embodiment, maximum current Im is about 0.02 amps.

$$ACC = Kt \cdot MOACCEL \cdot R \cdot TPI \cdot SERVO\ PERIOD$$

$$ACC = 6.331\ Tracks/(Sector\ Period)^2/Amp$$

where

SERVO PERIOD = 233.33 μseconds/sector period
R = Actuator centerline to head-gap radius
   = 1.075 Inches/radian
TPI = 1900.00 tracks/inch
MOACCEL = 35585.0 Radians/second²/in-oz
Kt = 1.6

Actuator current $IACTUATOR_S$ for a seek of length S tracks is $$INACTUATOR_S = \frac{\left[ \frac{4 \cdot S}{(SEEKTIME_S)^2} \right]}{ACC}$$

Figure 12:
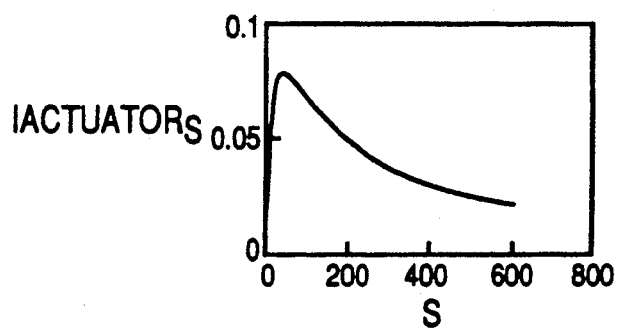
FIG. 12 illustrates actuator current IACTUATOR$_S$ for a seek length of S tracks where the range of tracks is from one to 615.
Figure 13:
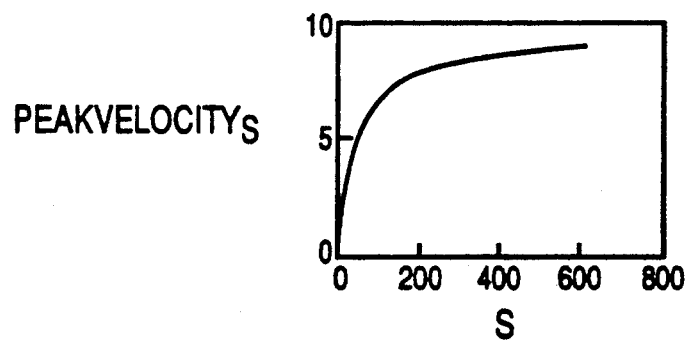
FIG. 13 illustrates actuator peak velocity PEAKVELOCITY$_S$ for a seek length of S tracks where the range of tracks is from one to 615.

This expression follows from the expressions given above where variable $INACTUATOR_S$ is substituted for variable Im. FIG. 12 is a graph of the above expression for seek lengths ranging from zero to 615 tracks. FIG. 13 is a graph of the peak velocity reached in each seek for seek lengths again ranging from zero to 615 tracks.

With this background, silent seek servo controller 400 is now described in more detail. In response to a seek command and the new track position from disk controller 420, seek length 451 determines the seek length in terms of tracks from the current actuator position. Seek length 451 also closes switch 450 and sends the new track location to desired track 452. Also, switch 450 is closed when disk controller 420 changes the read/write head and the new read/write head is positioned off by one track, i.e., a one track seek is performed.

In this embodiment, desired track 452 stores the new track location in memory. Alternatively, in another embodiment, the new track location is stored in a register.

Seek length 451 also passes the seek length in tracks to seek time converter 453. In one embodiment, expression (5) above is used to convert the seek length in tracks to a seek length in terms of the number of sector periods in the seek, i.e., the number of different positions where the actuator position is updated during the seek. In another embodiment, the seek length in tracks is an entry to a look-up table that was generated using expression (5). One embodiment of such a look-up table is presented in Appendix A. In Appendix A, the values go across a row of the table and then down to the next row.

However, more generally, seek time converter 453 is a look-up table wherein each possible seek length in terms of tracks has a corresponding seek length in terms of sector periods. Further, the seek length in terms of sector periods may be different depending on whether the seek is towards the center of the disk or away from the center of the disk.

Seek time converter 453 sends the seek length in sector periods to seek time counter 454. Seek time counter 454 loads the number of sector periods in a counter and sends the initial value of the counter to pointer generator 455. In response to each subsequent sector pulse, seek time counter 454 increments the value of the counter and sends the new value to pointer generator 455. When the total number of sector periods are counted, seek time counter 454 is disabled.

As explained more completely below, position versus sector period, as represented by expressions (2) and (4) above, is contained in a look-up table. Consequently, pointer generator 455 determines the appropriate position in the table for the sector period from seek time counter 454, i.e, an address to a location in the look-up table is determined based on the fraction of time elapsed in the seek.

Since the position look-up table represents a normalized seek length and not an absolute position, the sector period must be related to the length of the look-up table. For this example, assume that the position look-up table has m entries where m is a power of two. The seek time for a seek of S tracks is $SEEKTIME_S$. For each sector period SKTM during the seek where $$SKTM = 1, 2, \ldots, SEEKTIME_S$$

the pointer TABLE POSITION is $$TABLE\ POSITION = m - \left( \frac{m}{SEEKTIME_S} \cdot (SKTM) \right)$$

As explained above, for a 1 track seek, the number of sector periods is, in one embodiment, ten so that $SEEKTIME_S = 10$. Thus, the pointers generated by pointer generator when m=512 are given in Table 1.

TABLE 1

| Servo Period (SKTM) | Table Position |
| --- | --- |
| 1 | 461 |
| 2 | 410 |
| 3 | 358 |
| 4 | 307 |
| 5 | 256 |
| 6 | 205 |
| 7 | 154 |
| 8 | 102 |
| 9 | 51 |
| 10 | 0 |

In this embodiment, position versus sector period, as represented by expressions (2) and (4) above, is contained in a ROM and the pointer from pointer generator 455 is an address to the appropriate position in the ROM for the value of the sector period. One embodiment of a look-up table suitable for use in this invention is presented in Appendix B. In Appendix B, the values go across a row and then down to the next row. Alternatively, of course, the look-up table could be loaded in random access memory and pointer generator 455 adjusted accordingly. In either case, position look-up 456 retrieves the value in the look-up table from memory for the specified sector period in the seek.

Hence, position look-up 456 provides position versus sector period. The positions in the look-up table are based upon the smooth, continuous and completely symmetric acceleration trajectory. Thus, the look-up table converts the sector period to a new position based on the low noise acceleration trajectory.

In one embodiment, the look-up table has four hundred two byte entries. The amplitude of the entries range from 0 to 1023.63. Further, the values in the look-up for a particular sector period are 1024 minus the value obtained from expressions:

$$SINPOS_{SCTR} = ACC*Im* \left[ \frac{(SCTR*SCTR)}{2} - \left[ \frac{1 - \cos(K\sin*SCTR)}{K\sin*K\sin} \right] \right]$$

and $$SINDEPOS_{SCTRD} = (-ACC)*Im*$$

$$\left[ \frac{[SCTRD - [2 \cdot \tau]]^2}{2} - \left[ \frac{1 - \cos(K\sin * SCTRD)}{K\sin \cdot K\sin} \right] - \frac{\tau^2}{2} \right] + SINPOS_T.$$

The variables in these expressions are the same as those defined above. Further, variable SCTR represents the fraction of the seek time that has elapsed up to one-half of the seek time. Variable SCTRD represents the fraction of the seek time from one-half of the seek time up to the full seek time.

Hence, the values in the look-up table initially range from a small value to a large value as the address increases. However, as shown above, the pointer starts at a large value and goes to a small value. Consequently, the values retrieved early in the seek are large and as the seek nears an end the values approach the lower limit of the table.

The position value obtained from position look-up 456 is scaled in scale factor 457. Scale factor 457 divides the position value by the maximum value in the look-table. The resulting fraction is multiplied by the seek length. Further, if the desired track has a larger number than the track position when the seek was initiated, the result is multiplied by "−1". The scaled value from scale factor 457 is then added to desired track 452 to obtain the position output signal to PID servo compensator 411.

The use of the digital position output signal from silent seek servo controller 400 to move actuator 415 is known to those skilled in the art because the operations are the same as those used in prior systems. The difference is in the generation of the digital position output signal by silent seek servo controller 400 of this invention.

Further, the simplicity of silent seek servo controller 400 allows the servo system to remain in the high gain mode throughout the seek period. Prior art seek systems reduced the rate of change of the gain which in turn modified the phase margin to thereby maintain stability. Since the servo system is maintained in a high gain mode status, during operation of silent seek servo controller 400, the intrinsic positioning error is very small.

Figure 14:
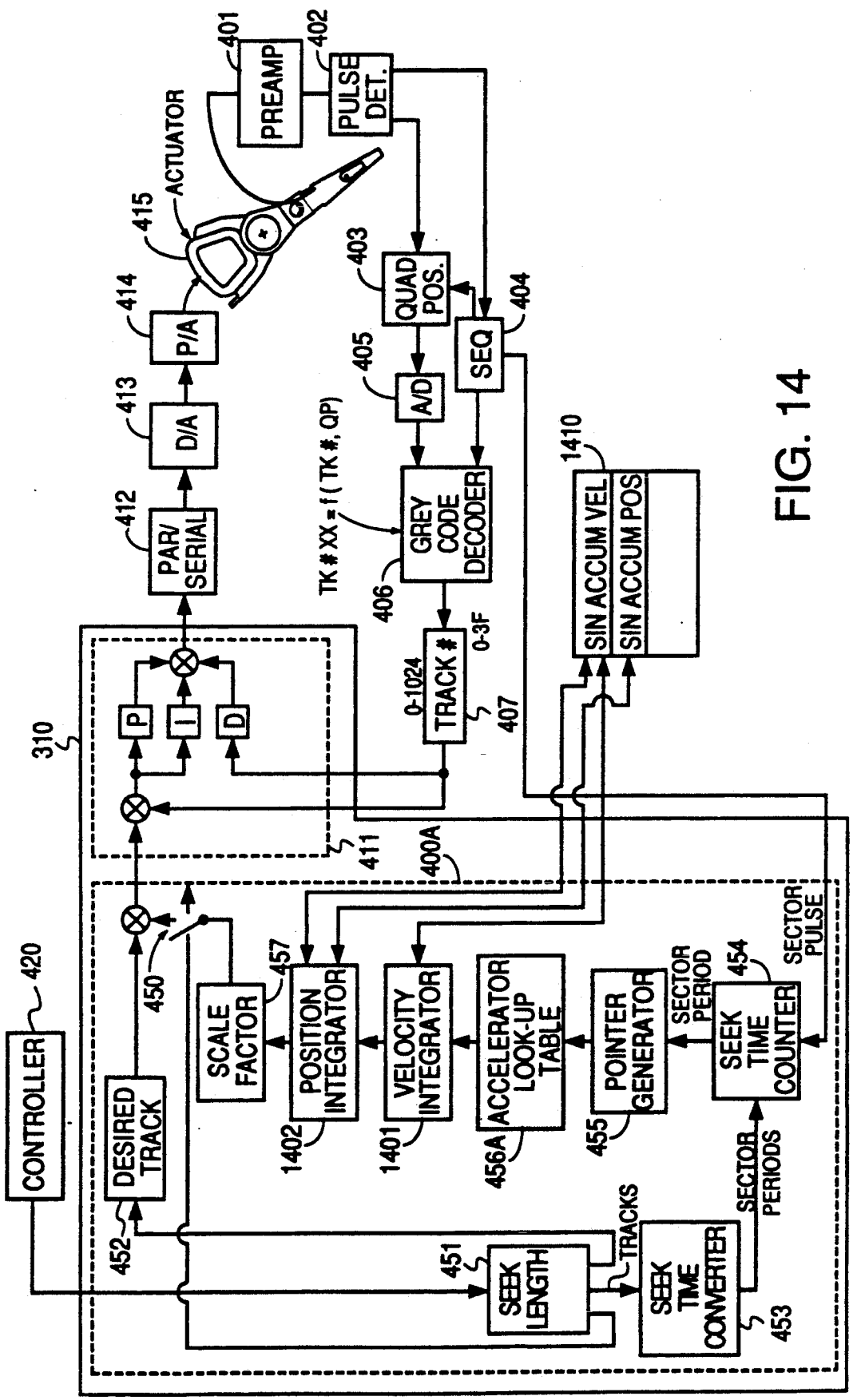
FIG. 14 is a block diagram of an alternative embodiment of the silent seek servo system of this invention.
Figure 15:
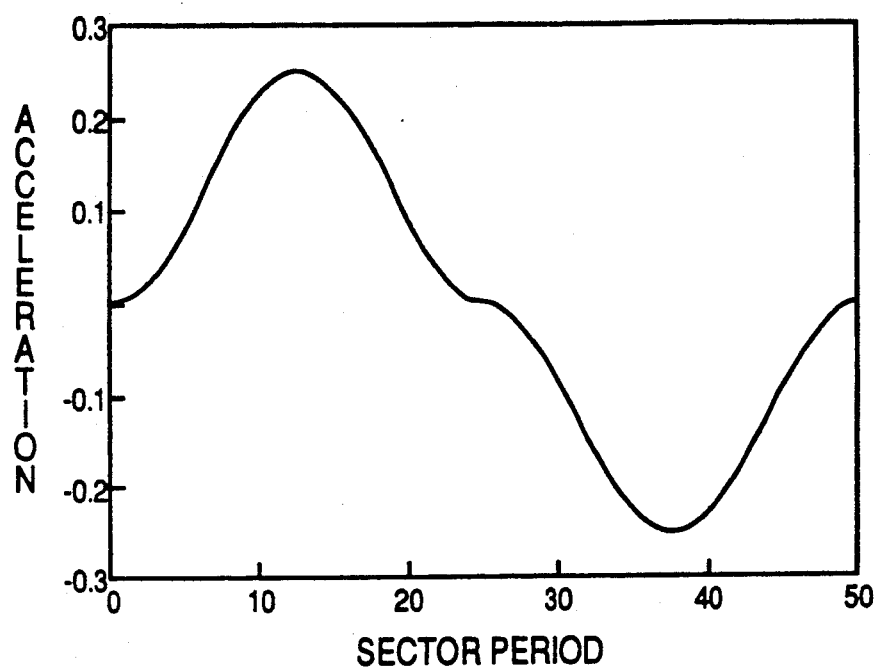
FIG. 15 is a graphical illustration of the actuator acceleration trajectory used in the invention.

In another embodiment, silent seek servo system 400A (FIG. 14) is similar to that of silent seek servo system 400 (FIG. 4). Seek length 451, desired track 452, seek time counter 454, and position generator 455 are the same as those described above and that description is incorporated herein by reference. However, in this embodiment, the acceleration curve (FIG. 15) is integrated by silent seek servo system 400A to obtain a position.

Specifically, acceleration look-up 456A contains values of the following expressions vs. the elapsed fraction of the seek time.

$$SINACCEL_{SCTR} = ACC*Im* (1 - \cos (K\sin*SCTR))$$

$$SINDECEL_{SCTRD} = -ACC*Im * (1 - \cos(K\sin*SCTRD))$$

Here, variable SCTR represents the fraction of the seek time that has elapsed between the start and one-half of the seek time. Variable SCTRD represents the fraction of the seek time that has elapsed between one-half the seek time and the seek time.

These acceleration values are contained in a ROM, in one embodiment, and the pointer from pointer generator 455 is an address to the appropriate position in the ROM for the value of the sector period. Alternatively, of course, the look-up table could be loaded in random access memory and pointer generator 455 adjusted accordingly. In either case, acceleration look-up 456A retrieves the value in the look-up table from memory for the specified sector period in the seek. Hence, the look-up table provides acceleration versus sector period.

The value retrieved SINADECEL from look-up table 456A is provided to velocity integrator 1401. Velocity integrator 1401 adds value SINADECEL to the value retrieved from velocity accumulator SINAC- CUMVEL in memory 1410. The resulting value is then stored in velocity accumulator SINACCUMVEL. Processing then transfers to position integrator 1402.

Position integrator 1402 retrieves the value in velocity accumulator SINACCUMVEL and adds this value to the value in position accumulator SINACCUMPOS in memory 1410. The resulting value is stored in position accumulator SINACCUMPOS and passed to scale factor 457. The two accumulators are zeroed, at the start of each seek.

As described above, scale factor 457 divides the value of position accumulator SINACCUMPOS by the scale factor and multiplies by the seek length. Again if the seek is from a lower numbered track to a higher numbered track the final result is multiplied by "−1". The remaining operations are the same as those described above for silent seek servo system 400, which are incorporated herein by reference.

Thus, in this embodiment, the basic principles are the same as those described above, except the integration of the sinusoidal acceleration is performed directly by silent seek servo system 400A.

The above embodiments are only illustrative of the principles of this invention and are not intended to limit the invention to the particular embodiments described. For example, the silent seek servo controller of this invention may be used in a read only system or in a system that uses other than a magnetic medium. These and other applications will be apparent to those skilled in the art in view of this disclosure.

APPENDIX A
TABLE FOR CONVERSION OF SEEK LENGTH IN TRACKS TO SEEK LENGTH IN SECTOR PERIODS

| | | | | | | |
|---|---|---|---|---|---|---|
| 00000h | 0000Bh | 0000Bh | 0000Bh | 0000Bh | 0000Bh | 0000Bh |
| 0000Bh | 0000Ch | 0000Ch | 0000Ch | 0000Ch | 0000Ch | 0000Ch |
| 0000Dh | 0000Dh | 0000Dh | 0000Dh | 0000Dh | 0000Dh | 0000Eh |
| 0000Eh | 0000Eh | 0000Eh | 0000Eh | 0000Eh | 0000Fh | 0000Fh |
| 0000Fh | 0000Fh | 0000Fh | 0000Fh | 00010h | 00010h | 00010h |
| 00010h | 00010h | 00010h | 00011h | 00011h | 00011h | 00011h |
| 00011h | 00011h | 00012h | 00012h | 00012h | 00012h | 00012h |
| 00012h | 00012h | 00013h | 00013h | 00013h | 00013h | 00013h |
| 00013h | 00014h | 00014h | 00014h | 00014h | 00014h | 00014h |
| 00015h | 00015h | 00015h | 00015h | 00015h | 00015h | 00016h |
| 00016h | 00016h | 00016h | 00016h | 00016h | 00017h | 00017h |
| 00017h | 00017h | 00017h | 00017h | 00018h | 00018h | 00018h |
| 00018h | 00018h | 00018h | 00019h | 00019h | 00019h | 00019h |
| 00019h | 00019h | 00019h | 0001Ah | 0001Ah | 0001Ah | 0001Ah |
| 0001Ah | 0001Ah | 0001Bh | 0001Bh | 0001Bh | 0001Bh | 0001Bh |
| 0001Bh | 0001Ch | 0001Ch | 0001Ch | 0001Ch | 0001Ch | 0001Ch |
| 0001Dh | 0001Dh | 0001Dh | 0001Dh | 0001Dh | 0001Dh | 0001Eh |
| 0001Eh | 0001Eh | 0001Eh | 0001Eh | 0001Eh | 0001Fh | 0001Fh |
| 0001Fh | 0001Fh | 0001Fh | 0001Fh | 00020h | 00020h | 00020h |
| 00020h | 00020h | 00020h | 00020h | 00021h | 00021h | 00021h |
| 00021h | 00021h | 00021h | 00022h | 00022h | 00022h | 00022h |
| 00022h | 00022h | 00023h | 00023h | 00045h | 00045h | 00045h |
| 00046h | 00046h | 00046h | 00047h | 00047h | 00047h | 00048h |
| 00048h | 00048h | 00049h | 00049h | 00049h | 0004Ah | 0004Ah |
| 0004Ah | 0004Bh | 0004Bh | 0004Bh | 0004Ch | 0004Ch | 0004Ch |
| 0004Dh | 0004Dh | 0004Dh | 0004Eh | 0004Eh | 0004Eh | 0004Fh |
| 0004Fh | 0004Fh | 00050h | 00050h | 00050h | 00051h | 00051h |
| 00051h | 00052h | 00052h | 00052h | 00053h | 00053h | 00053h |
| 00054h | 00054h | 00054h | 00055h | 00055h | 00055h | 00055h |
| 00056h | 00056h | 00056h | 00057h | 00057h | 00057h | 00058h |
| 00058h | 00058h | 00059h | 00059h | 00059h | 0005Ah | 0005Ah |
| 0005Ah | 0005Bh | 0005Bh | 0005Ch | 0005Ch | 0005Ch | 0005Ch |
| 0005Dh | 0005Dh | 0005Dh | 0005Eh | 0005Eh | 0005Eh | 0005Fh |
| 0005Fh | 0005Fh | 00060h | 00060h | 00060h | 00061h | 00061h |
| 00061h | 00062h | 00062h | 00062h | 00063h | 00063h | 00063h |
| 00064h | 00064h | 00064h | 00065h | 00065h | 00065h | 00066h |
| 00066h | 00066h | 00066h | 00067h | 00067h | 00067h | 00068h |
| 00068h | 00068h | 00069h | 00069h | 00069h | 0006Ah | 0006Ah |
| 0006Ah | 0006Bh | 0006Bh | 0006Bh | 0006Ch | 0006Ch | 0006Ch |
| 0006Dh | 0006Dh | 0006Dh | 0006Eh | 0006Eh | 0006Eh | 0006Fh |
| 0006Fh | 0006Fh | 00070h | 00070h | 00070h | 00071h | 00071h |
| 00071h | 00072h | 00072h | 00072h | 00073h | 00073h | 00073h |
| 00074h | 00074h | 00074h | 00075h | 00075h | 00075h | 00076h |
| 00076h | 00076h | 00077h | 00077h | 00077h | 00077h | 00078h |
| 00078h | 00078h | 00079h | 00079h | 00079h | 0007Ah | 0007Ah |
| 0007Ah | 0007Bh | 0007Bh | 0007Bh | 0007Ch | 0007Ch | 0007Ch |
| 0007Dh | 0007Dh | 0007Dh | 0007Eh | 0007Eh | 0007Eh | 0007Fh |
| 0007Fh | 0007Fh | 00080h | 00080h | 00080h | 00081h | 00081h |
| 00081h | 00082h | 00082h | 00082h | 00083h | 00083h | 00083h |
| 00084h | 00084h | 00084h | 00085h | 00085h | 00085h | 00086h |
| 00086h | 00086h | 00087h | 00087h | 00087h | 00088h | 00088h |
| 00088h | 00088h | 00089h | 00089h | 00089h | 0008Ah | 0008Ah |
| 0008Ah | 0008Bh | 0008Bh | 0008Bh | 0008Ch | 0008Ch | 0008Ch |
| 0008Dh | 0008Dh | 0008Dh | 0008Eh | 0008Eh | 0008Eh | 0008Fh |
| 0008Fh | 0008Fh | 00090h | 00090h | 00090h | 00091h | 00091h |
| 00091h | 00092h | 00092h | 00092h | 00093h | 00093h | 00093h |
| 00094h | 00094h | 00094h | 00095h | 00095h | 00095h | 00096h |
| 00096h | 00096h | 00097h | 00097h | 00097h | 00098h | 00098h |
| 00098h | 00099h | 00099h | 00099h | 00099h | 0009Ah | 0009Ah |
| 0009Ah | 0009Bh | 0009Bh | 0009Bh | 0009Ch | 0009Ch | 0009Ch |

APPENDIX A
TABLE FOR CONVERSION OF SEEK LENGTH IN TRACKS TO SEEK LENGTH IN SECTOR PERIODS

| | | | | | | |
|---|---|---|---|---|---|---|
| 0009Dh | 0009Dh | 0009Dh | 0009Eh | 0009Eh | 0009Eh | 0009Fh |
| 0009Fh | 0009Fh | 000A0h | 000A0h | 000A0h | 000A1h | 000A1h |
| 000A1h | 000A2h | 000A2h | 000A2h | 000A3h | 000A3h | 000A3h |
| 000A4h | 000A4h | 000A4h | 000A5h | 000A5h | 000A5h | 000A6h |
| 000A6h | 000A6h | 000A7h | 000A7h | 000A7h | 000A8h | 000A8h |
| 000A8h | 000A9h | 000A9h | 000A9h | 000AAh | 000AAh | 000AAh |
| 000AAh | 000ABh | 000ABh | 000ABh | 000ACh | 000ACh | 000ACh |
| 000ADh | 000ADh | 000ADh | 000AEh | 000AEh | 000AEh | 000AFh |
| 000AFh | 000AFh | 000B0h | 000B0h | 000B0h | 000B1h | 000B1h |
| 000B1h | 000B2h | 000B2h | 000B2h | 000B3h | 000B3h | 000B3h |
| 000B4h | 000B4h | 000B4h | 000B5h | 000B5h | 000B5h | 000B6h |
| 000B6h | 000B6h | 000B7h | 000B7h | 000B7h | 000B8h | 000B8h |
| 000B8h | 000B9h | 000B9h | 000B9h | 000BAh | 000BAh | 000BAh |
| 000BBh | 000BBh | 000BBh | 000BBh | 000BCh | 000BCh | 000BCh |
| 000BDh | 000BDh | 000BDh | 000BEh | 000BEh | 000BEh | 000BFh |
| 000BFh | 000BFh | 000C0h | 000C0h | 000C0h | 000C1h | 000C1h |
| 000C1h | 000C2h | 000C2h | 000C2h | 000C3h | 000C3h | 000C3h |
| 000C4h | 000C4h | 000C4h | 000C5h | 000C5h | 000C5h | 000C6h |
| 000C6h | 000C6h | 000C7h | 000C7h | 000C7h | 000C8h | 000C8h |
| 000C8h | 000C9h | 000C9h | 000C9h | 000CAh | 000CAh | 000CAh |
| 000CBh | 000CBh | 000CBh | 000CCh | 000CCh | 000CCh | 000CCh |
| 000CDh | 000CDh | 000CDh | 000CEh | 000CEh | 000CEh | 000CFh |
| 000CFh | 000CFh | 000D0h | 000D0h | 000D0h | 000D1h | 000D1h |
| 000D1h | 000D2h | 000D2h | 000D2h | 000D3h | 000D3h | 000D3h |
| 000D4h | 000D4h | 000D4h | 000D5h | 000D5h | 000D5h | 000D6h |
| 000D6h | 000D6h | 000D7h | 000D7h | 000D7h | 000D8h | 000D8h |
| 000D8h | 000D9h | 000D9h | 000D9h | 000DAh | 000DAh | 000DAh |
| 000DBh | 000DBh | 000DBh | 000DCh | 000DCh | 000DCh | 000DDh |
| 000DDh | 000DDh | 000DEh | 000DEh | 000DEh | 000DEh | 000DFh |
| 000DFh | 000DFh | 000E0h | 000E0h | 000E0h | 000E1h | 000E1h |
| 000E1h | 000E2h | 000E2h | 000E2h | 000E3h | 000E3h | 000E3h |
| 000E4h | 000E4h | 000E4h | 000E5h | 000E5h | 000E5h | 000E6h |
| 000E6h | 000E6h | 000E7h | 000E7h | 000E7h | 000E8h | 000E8h |
| 000E8h | 000E9h | 000E9h | 000E9h | 000EAh | 000EAh | 000EAh |
| 000EBh | 000EBh | 000EBh | 000ECh | 000ECh | 000ECh | 000EDh |
| 000EDh | 000EDh | 000EDh | 000EEh | 000EEh | 000EEh | 000EFh |
| 000EFh | 000EFh | 000F0h | 000F0h | 000F0h | 000F1h | 000F1h |
| 000F1h | 000F2h | 000F2h | 000F2h | 000F3h | 000F3h | 000F3h |
| 000F4h | 000F4h | 000F4h | 000F5h | 000F5h | 000F5h | 000F6h |
| 000F6h | 000F6h | 000F7h | 000F7h | 000F7h | 000F8h | 000F8h |
| 000F8h | 000F9h | 000F9h | 000F9h | 000FAh | 000FAh | 000FAh |
| 000FBh | 000FBh | 000FBh | 000FCh | 000FCh | 000FCh | 000FDh |
| 000FDh | 000FDh | 000FEh | 000FEh | 000FEh | 000FEh | 000FFh |
| 000FFh | 000FFh | 00100h | 00100h | 00100h | 00101h | 00101h |
| 00101h | 00102h | 00102h | 00102h | 00103h | 00103h | 00103h |
| 00104h | 00104h | 00104h | 00105h | 00105h | 00105h | 00106h |
| 00106h | 00106h | 00107h | 00107h | 00107h | 00108h | 00108h |
| 00108h | 00109h | 00109h | 00109h | 0010Ah | 0010Ah | 0010Ah |
| 0010Bh | 0010Bh | 0010Bh | 0010Ch | 0010Ch | 0010Ch | 0010Dh |
| 0010Dh | 0010Dh | 0010Eh | 0010Eh | 0010Eh | 0010Fh | 0010Fh |
| 0010Fh | 0010Fh | 00110h | 00110h | 00110h | 00111h | 00111h |
| 00111h | 00112h | 00112h | 00112h | 00113h | 00113h | 00113h |
| 00114h | 00114h | 00114h | 00115h | 00115h | 00115h | 00116h |
| 00116h | 00116h | 00117h | 00117h | 00117h | 00118h | 00118h |
| 00118h | 00119h | 00119h | 00119h | 0011Ah | 0011Ah | 0011Ah |
| 0011Bh | 0011Bh | 0011Bh | 0011Ch | 0011Ch | 0011Ch | 0011Dh |
| 0011Dh | 0011Dh | 0011Eh | 0011Eh | 0011Eh | 0011Fh | 0011Fh |
| 0011Fh | 00120h | 00120h | 00120h | 00120h | 00121h | 00121h |
| 00121h | 00122h | 00122h | 00122h | 00123h | 00123h | 00123h |
| 00124h | 00124h | 00124h | 00125h | 00125h | 00125h | 00126h |
| 00126h | 00126h | 00127h | 00127h | 00127h | 00128h | 00128h |
| 00128h | 00129h | 00129h | 00129h | 0012Ah | 0012Ah | 0012Ah |
| 0012Bh | 0012Bh | 0012Bh | 0012Ch | 0012Ch | 0012Ch | 0012Dh |
| 0012Dh | 0012Dh | 0012Eh | 0012Eh | 0012Eh | 0012Fh | 0012Fh |
| 0012Fh | 00130h | 00130h | 00130h | 00131h | 00131h | 00131h |
| 00131h | 00132h | 00132h | 00132h | 00133h | 00133h | 00133h |
| 00134h | 00134h | 00134h | 00135h | 00135h | 00135h | 00136h |
| 00136h | 00136h | 00137h | 00137h | 00137h | 00138h | 00138h |
| 00138h | 00139h | 00139h | 00139h | 0013Ah | 0013Ah | 0013Ah |
| 0013Bh | 0013Bh | 0013Bh | 0013Ch | 0013Ch | 0013Ch | 0013Dh |
| 0013Dh | 0013Dh | 0013Eh | 0013Eh | 0013Eh | 0013Fh | 0013Fh |
| 0013Fh | 00140h | 00140h | 00140h | 00141h | 00141h | 00141h |
| 00142h | 00142h | 00142h | 00142h | 00143h | 00143h | 00143h |
| 00144h | 00144h | 00144h | 00145h | 00145h | 00145h | 00146h |
| 00146h | 00146h | 00147h | 00147h | 00147h | 00148h | 00148h |
| 00148h | 00149h | 00149h | 00149h | 0014Ah | 0014Ah | 0014Ah |
| 0014Bh | 0014Bh | 0014Bh | 0014Ch | 0014Ch | 0014Ch | 0014Dh |
| 0014Dh | 0014Dh | 0014Eh | 0014Eh | 0014Eh | 0014Fh | 0014Fh |
| 0014Fh | 00150h | 00150h | 00150h | 00151h | 00151h | 00151h |

-continued

APPENDIX A
TABLE FOR CONVERSION OF SEEK LENGTH IN TRACKS TO SEEK LENGTH IN SECTOR PERIODS

| | | | | | | |
|---|---|---|---|---|---|---|
| 00152h | 00152h | 00152h | 00153h | 00153h | 00153h | 00153h |
| 00154h | 00154h | 00154h | 00155h | 00155h | 00155h | 00156h |
| 00156h | 00156h | 00157h | 00157h | 00157h | 00158h | 00158h |
| 00158h | 00159h | 00159h | 00159h | 0015Ah | 0015Ah | 0015Ah |
| 0015Bh | 0015Bh | 0015Bh | 0015Ch | 0015Ch | 0015Ch | 0015Dh |
| 0015Dh | 0015Dh | 0015Eh | 0015Eh | 0015Eh | 0015Fh | 0015Fh |
| 0015Fh | 00160h | 00160h | 00160h | 00161h | 00161h | 00161h |
| 00162h | 00162h | 00162h | 00163h | | | |

APPENDIX B
POSITION LOOK-UP TABLE

| | | | | | | |
|---|---|---|---|---|---|---|
| 00000h | 00000h | 00000h | 00000h | 00000h | 00000h | 00000h |
| 00000h | 00000h | 00000h | 00001h | 00001h | 00001h | 00002h |
| 00003h | 00003h | 00004h | 00006h | 00007h | 00009h | 0000Bh |
| 0000Dh | 00010h | 00013h | 00016h | 0001Ah | 0001Eh | 00023h |
| 00028h | 0002Eh | 00035h | 0003Ch | 00044h | 0004Dh | 00057h |
| 00061h | 0006Ch | 00079h | 00086h | 00094h | 000A4h | 000B4h |
| 000C6h | 000D9h | 000EDh | 00103h | 00119h | 00132h | 0014Ch |
| 00167h | 00184h | 001A3h | 001C3h | 001E5h | 00209h | 0022Eh |
| 00256h | 0027Fh | 002ABh | 002D8h | 00308h | 0033Ah | 0036Eh |
| 003A4h | 003DDh | 00417h | 00455h | 00494h | 004D6h | 0051Bh |
| 00562h | 005ACh | 005F9h | 00648h | 00699h | 006EEh | 00746h |
| 007A0h | 007FDh | 0085Dh | 008C0h | 00926h | 0098Fh | 009FBh |
| 00A69h | 00ADCh | 00B51h | 00BC9h | 00C44h | 00CC3h | 00D45h |
| 00DCAh | 00E52h | 00EDDh | 00F6Ch | 00FFEh | 01093h | 0112Bh |
| 011C7h | 01266h | 01308h | 013ADh | 01456h | 01502h | 015B1h |
| 01664h | 0171Ah | 017D3h | 0188Fh | 0194Fh | 01A11h | 01AD7h |
| 01BA0h | 01C6Dh | 01D3Ch | 01E0Fh | 01EE4h | 01FBDh | 02099h |
| 02178h | 02259h | 0233Eh | 02426h | 02510h | 025FEh | 026EEh |
| 027E1h | 028D7h | 029CFh | 02ACBh | 02BC9h | 02CC9h | 02DCCh |
| 02ED2h | 02FDAh | 030E4h | 031F1h | 03300h | 03411h | 03525h |
| 0363Bh | 03753h | 0386Dh | 03989h | 03AA8h | 03BC8h | 03CEAh |
| 03E0Eh | 03F33h | 0405Bh | 04184h | 042AEh | 043DBh | 04509h |
| 04638h | 04769h | 0489Bh | 049CEh | 04B03h | 04C39h | 04D70h |
| 04EA8h | 04FE2h | 0511Ch | 05258h | 05394h | 054D1h | 0560Fh |
| 0574Eh | 0588Eh | 059CEh | 05B0Fh | 05C51h | 05D93h | 05ED6h |
| 06019h | 0615Dh | 062A2h | 063E6h | 0652Bh | 06671h | 067B6h |
| 068FCh | 06A43h | 06B89h | 06CD0h | 06E17h | 06F5Eh | 070A5h |
| 071ECh | 07333h | 0747Bh | 075C2h | 0770Ah | 07852h | 07999h |
| 07AE1h | 07C28h | 07D70h | 07EB8h | 08000h | 08147h | 0828Fh |
| 083D7h | 0851Eh | 08666h | 087ADh | 088F5h | 08A3Dh | 08B84h |
| 08CCCh | 08E13h | 08F5Ah | 090A1h | 091E8h | 0932Fh | 09476h |
| 095BCh | 09703h | 09849h | 0998Eh | 09AD4h | 09C19h | 09D5Dh |
| 09EA2h | 09FE6h | 0A129h | 0A26Ch | 0A3AEh | 0A4F0h | 0A631h |
| 0A771h | 0A8B1h | 0A9F0h | 0AB2Eh | 0AC6Bh | 0ADA7h | 0AEE3h |
| 0B01Dh | 0B157h | 0B28Fh | 0B3C6h | 0B4FCh | 0B631h | 0B764h |
| 0B896h | 0B9C7h | 0BAF6h | 0BC24h | 0BD51h | 0BE7Bh | 0BFA4h |
| 0C0CCh | 0C1F1h | 0C315h | 0C437h | 0C557h | 0C676h | 0C792h |
| 0C8ACh | 0C9C4h | 0CADAh | 0CBEEh | 0CCFFh | 0CE0Eh | 0CF1Bh |
| 0D025h | 0D12Dh | 0D233h | 0D336h | 0D436h | 0D534h | 0D630h |
| 0D728h | 0D81Eh | 0D911h | 0DA01h | 0DAEFh | 0DBD9h | 0DCC1h |
| 0DDA6h | 0DE87h | 0DF66h | 0E042h | 0E11Bh | 0E1F0h | 0E2C3h |
| 0E392h | 0E45Fh | 0E528h | 0E5EEh | 0E680h | 0E770h | 0E82Ch |
| 0E8E5h | 0E99Bh | 0EA4Eh | 0EAFDh | 0EBA9h | 0EC52h | 0ECF7h |
| 0ED99h | 0EE38h | 0EED4h | 0EF6Ch | 0F001h | 0F093h | 0F122h |
| 0F1ADh | 0F235h | 0F2BAh | 0F33Ch | 0F3BBh | 0F436h | 0F4AEh |
| 0F523h | 0F596h | 0F604h | 0F670h | 0F6D9h | 0F73Fh | 0F7A2h |
| 0F802h | 0F85Fh | 0F889h | 0F911h | 0F966h | 0F987h | 0FA06h |
| 0FA53h | 0FA9Dh | 0FAE4h | 0FB29h | 0FB68h | 0FBAAh | 0FBE8h |
| 0FC22h | 0FC58h | 0FC91h | 0FCC5h | 0FCF7h | 0FD27h | 0FD54h |
| 0FD80h | 0FDA9h | 0FDD1h | 0FDF6h | 0FE1Ah | 0FE3Ch | 0FE5Ch |
| 0FE7Bh | 0FE98h | 0FEB3h | 0FECDh | 0FEE6h | 0FEFCh | 0FF12h |
| 0FF26h | 0FF39h | 0FF4Bh | 0FF58h | 0FF6Bh | 0FF79h | 0FF86h |
| 0FF93h | 0FF9Eh | 0FFA8h | 0FFB2h | 0FFBBh | 0FFC3h | 0FFCAh |
| 0FFD1h | 0FFD7h | 0FFDCh | 0FFE1h | 0FFE5h | 0FFE9h | 0FFECh |
| 0FFEFh | 0FFF2h | 0FFF4h | 0FFF6h | 0FFF8h | 0FFF9h | 0FFFBh |
| 0FFFCh | 0FFFCh | 0FFFDh | 0FFFEh | 0FFFEh | 0FFFEh | 0FFFFh |
| 0FFFFh | 0FFFFh | 0FFFFh | 0FFFFh | 0FFFFh | 0FFFFh | 0FFFFh |
| 0FFFFh | | | | | | |

We claim:

1. In a miniature disk drive, a silent seek servo system comprising:

a microprocessor; and a seek controller, operating in said microprocessor and responsive to a seek command from a disk controller, for generating a positioning signal for an actuator of said miniature disk drive wherein said positioning signal upon application to said actuator moves said actuator with a smooth, continuous, and completely symmetric acceleration trajectory thereby minimizing acoustic noise generated by acceleration and deceleration of said actuator, said seek controller further comprising:

means, responsive to each sector pulse generated during a seek, for counting each sector pulse generated during said seek wherein each sector pulse represents one sector period; and look-up table means, operatively coupled to said counting means, having a plurality of values wherein each value represents an actuator position for an elapsed time of the seek and further wherein said elapsed time is measured in terms of sector periods.

2. The silent seek servo system of claim 1 wherein said seek controller further comprises:

pointer generating means, operatively coupled to said counter means and to said look-up table means, for generating a position pointer to a value in said look-up table corresponding to the servo period count from said counting means in relation to the total seek time in sector periods.

3. The silent seek servo system of claim 2 wherein said pointer generating means generates a pointer position TABLE POSITION given by:

$$\text{TABLE POSITION} = m - \left( \frac{m}{\text{SEEKTIME}_S} * (SKTM) \right)$$

wherein the seek time for a seek of S tracks is SEEKTIME$_S$; SKTM represents the sector period count from said counting means and said look-up table includes m values.

4. The silent seek servo system of claim 1 wherein said look-up table is stored in a read-only memory.

5. The silent seek servo system of claim 1 wherein said values in said look-up table are determined using the expressions:

$$SINPOS_{SCTR} = ACC*Im* \left[ \frac{(SCTR*SCTR)}{2} - \left[ \frac{1 - \cos(K\sin*SCTR)}{K\sin*K\sin} \right] \right]$$

and $$SINDERPOS_{SCTRD} = (-ACC)*Im*$$

$$\left[ \frac{[SCTRD - [2\tau]]^2}{2} - \left[ \frac{1 - \cos(K\sin * SCTRD)}{K\sin*K\sin} \right] - \frac{\tau^2}{2} \right] + SINPOS_\tau$$

wherein
$ACC$ = acceleration constant;
$Im$ = maximum actuator current;

$$K_{sin} = \frac{2*\pi}{\tau};$$

SEEKTIME = number of sector periods elapsed in the seek;

$$\tau = \frac{\text{SEEKTIME}}{2};$$

$SCTR = 0, 1, \ldots, \tau$
$SECTD = \tau, \ldots, \text{SEEKTIME}$

6. In a disk drive, a silent seek servo system comprising:
a microprocessor; and
a seek controller operating in said microprocessor, and further comprising:

seek time counter means, responsive to each sector pulse generated during a seek, wherein said seek time counter means counts each sector pulse generated during said seek and generates a signal representing the number of sector pulses counted and further wherein each sector pulse represents one sector period; and look-up table means, operatively coupled to said seek time counter means, having a plurality of actuator position values
wherein in response to each signal from said seek time counter means, one of said actuator position values is used to position an actuator of said miniature disk drive and further wherein upon moving said actuator in response to said positioning values, said actuator moves with a smooth, continuous, and symmetric acceleration trajectory thereby minimizing acoustic noise generated by acceleration.

7. The silent seek servo system of claim 6 wherein said seek controller further comprises:

pointer generator means operatively connected to said seek time counter means and to said look-up table means wherein in response to the signal representing the number of sector pulses counted, said pointer generator means generates a pointer to a value in said look-up table means thereby operatively coupling said seek time counter means to said look-up table means.

8. The silent seek servo system of claim 6 wherein said seek controller further comprises:

seek length means connected to receive a track position from a disk drive controller wherein said seek length means determines a seek length in tracks.

9. The silent seek servo system of claim 8 wherein said seek controller further comprises:

seek time converter means operably connected to said seek length means and to said seek time counter means wherein said seek time converter changes said seek length in tracks to a seek length signal in sector periods and supplies said seek length signal in sector periods to said seek time counter means.

10. The silent seek servo system of claim 8 wherein said seek controller further comprises:

track register means operatively connected to said seek length means wherein in response to a signal from said seek length means, said track register means stores a value of a track number indicating a desired location of said actuator after completion of said seek.

11. In a disk drive, a silent seek servo system comprising:

a microprocessor; and a seek controller operating in said microprocessor, and further comprising:

seek time counter means, responsive to each sector pulse generated during a seek, wherein said seek time counter means counts each sector pulse generated during said seek and generates a signal representing the number of sector pulses counted and further wherein each sector pulse represents one sector period; and look-up table means, operatively coupled to said seek time counter means, having a plurality of actuator acceleration values wherein in response to each signal from said seek time counter means, one of said actuator acceleration values is used to position an actuator of said miniature disk and further wherein upon moving said actuator in response to said acceleration values, said actuator moves with a smooth, continuous, and symmetric acceleration trajectory thereby minimizing acoustic noise generated by acceleration.

12. The silent seek servo system of claim 11 wherein said seek controller further comprises:

velocity integrator means, operably connected to said look-up table, wherein said velocity integrator means generates a velocity signal value that indicates a velocity of said actuator which results from a time integration of said acceleration values from said look-up table means.

13. The silent seek servo system of claim 11 wherein said velocity integrator means further comprises:

velocity accumulator means wherein the velocity signal value is stored in said velocity accumulator.

14. The silent seek servo system of claim 12 wherein said seek controller further comprises:

position integrator means, operably connected to said seek controller further comprises:

position integrator means, operably connected to said velocity integrator means, wherein said position integrator means generates a position signal value that indicates a position of said actuator which results from a time integration of said velocity signal values from said velocity integrator means.

15. The silent seek servo system of claim 14 wherein said position integrator means further comprises:

position accumulator means wherein the position signal value is stored in said position accumulator means.

16. The silent seek servo system of claim 11 wherein said seek controller further comprises:

pointer generator means operatively connected to said seek time counter means and to said look-up table means wherein in response to the signal representing the number of sector pulses counted, said pointer generator means generates a pointer to a value in said look-up table means thereby operatively coupling said seek time counter means to said look-up table means.

17. The silent seek servo system of claim 11 wherein said seek controller further comprises:

seek length means connected to receive a track position from a disk drive controller wherein said seek length means determines a seek length in tracks.

18. The silent seek servo system of claim 17 wherein said seek controller further comprises:

seek time converter means operably connected to said seek length means and to said seek time counter means wherein said seek time converter changes said seek length in tracks to a seek length signal in sector periods and supplies said seek length signal in sector periods to said seek time counter means.

19. The silent seek servo system of claim 17 wherein said seek controller further comprises:

track register means operatively connected to said seek length means wherein in response to a signal from said seek length means, said track register means stores a value of a track number indicating a desired location of said actuator after completion of said seek.

* * * * *